(12) United States Patent
Barbetti et al.

(10) Patent No.: US 9,216,621 B2
(45) Date of Patent: Dec. 22, 2015

(54) APPARATUS FOR ANGULAR POSITIONING OF AN OPERATING ARM OF A TIRE CHANGING MACHINE

(75) Inventors: Mauro Barbetti, Correggio (IT); Michele Barbetti, Correggio (IT); Gianfranco Pellacani, Correggio (IT); Roberto Iotti, Correggio (IT); Andrea Ligabue, Correggio (IT)

(73) Assignee: TECO S.r.L., Corregio (IT)

( * ) Notice: Subject to any disclaimer, the term of this patent is extended or adjusted under 35 U.S.C. 154(b) by 503 days.

(21) Appl. No.: 13/474,142

(22) Filed: May 17, 2012

(65) Prior Publication Data

US 2012/0298313 A1 Nov. 29, 2012

(30) Foreign Application Priority Data

May 23, 2011 (IT) .............................. MO2011A0120

(51) Int. Cl.
*B60C 25/138* (2006.01)
*B60C 25/132* (2006.01)
*B60C 25/05* (2006.01)

(52) U.S. Cl.
CPC ........... *B60C 25/138* (2013.01); *B60C 25/0578* (2013.04); *B60C 25/132* (2013.01)

(58) Field of Classification Search
CPC .... B60C 25/138; B60C 25/132; B60C 25/02; B60C 25/04; B60C 25/025

USPC .................................. 157/1.17, 1.24–1.28, 14
See application file for complete search history.

(56) References Cited

U.S. PATENT DOCUMENTS

| | | | | | |
|---|---|---|---|---|---|
| 5,325,903 | A | * | 7/1994 | du Quesne | 157/1.24 |
| 5,472,034 | A | * | 12/1995 | Corghi | 157/1.24 |
| 2001/0000391 | A1 | * | 4/2001 | Kane et al. | 157/1.24 |
| 2002/0046814 | A1 | | 4/2002 | Vignoli | |

FOREIGN PATENT DOCUMENTS

| | | |
|---|---|---|
| DE | 30 16 193 A1 | 11/1980 |
| EP | 0 572 064 A1 | 12/1993 |
| EP | 1 201 467 A2 | 5/2002 |

* cited by examiner

*Primary Examiner* — Robert Scruggs
(74) *Attorney, Agent, or Firm* — R. Neil Sudol; Henry D. Coleman

(57) ABSTRACT

In an apparatus for angular positioning of an operating arm of a tire changing machine, the arm has a first or proximal end hinged to a column extending vertically from the base of the tire changing machine. The arm is hinged to the column for swinging in a horizontal plane in a first direction of rotation toward a work position or in an opposite direction of rotation toward a rest position. The arm has an opposite, distal end having a support element for supporting work tools associated therewith. An adjustable lock or stop is provided for locking rotation of the operating arm in the first direction of rotation, the apparatus comprising a second lock or stop for locking rotation of the operating arm in the second direction of rotation, opposite to the first direction of rotation.

14 Claims, 8 Drawing Sheets

APPARATUS FOR ANGULAR POSITIONING OF AN OPERATING ARM OF A TIRE CHANGING MACHINE

The invention relates to an apparatus for angular positioning of an operating arm of a tire changing machine, particularly designed to fix a predetermined angular position of the operating arm during tire removal and mounting.

BACKGROUND ART

Tire changing machines are known to comprise, in short, a base with a rotatable platform or equivalent device mounted thereto, both known as a "self-centering unit", defining a generally horizontal plane, upon which vehicle wheels are laid and locked for tire removal or mounting.

An upwardly facing column is also provided at one end of the base, and supports at its upper end a horizontal operating arm which, in turn, has an adjustable connection device at its free distal end with respect to the column, for connection of a generally known vertical rod, hereinafter referred to as "pole", which has at its lower end a connector for alternative attachment of various work tools, to be used by tire repairers for removing and mounting tires from and to respective wheel rims, which tools shall be changed according to the various types of tires and rims.

The arm is hinged to the column to swing in a swinging plane, which is also horizontal, like the plane of the self-centering unit, and move the pole parallel to itself from a position of non-interference with the wheel when the latter is locked on the self-centering unit, i.e. away from the self-centering unit, to a work position on the wheel, i.e. converging toward the self-centering unit, and vice versa.

The swinging movements of the arm and the vertical displacements of the pole relative to the arm toward or away from the self-centering unit are manually imparted by the tire changer.

A stop apparatus is also provided between the column and the arm, for stopping the rotation of the operating arm, when the latter is rotated toward the self-centering unit to reach the work position.

This stop apparatus is adjustable for the tire repairer to precisely lock the rotation of the arm in a predetermined position, according to the diameter of a wheel, and for the pole to be substantially aligned with the vertical of a point of the circle in which an active portion of a work took, namely a hook, has to be introduced, particularly between the edge of the rim and the tire bead, for hooking the latter from the inside and extract it from the rim edge, without damaging the rim or the bead and facilitating the tire repairer's work even with tires having particularly rigid sidewalls, like in low-profile tires.

These work tools have hooks rotatably articulated to a shank, integral with the pole, for the hooks to be positioned with a proper orientation using an appropriate pneumatic actuator, which will allow them to be oriented relative to the profiles of the bead and rim edges and to move beyond them as they are introduced therebetween and then to hook the inner edges of the beads during removal thereof from the rims.

The hook-shaped end of the work tool is introduced between the tire bead and the rim edge by a thrust exerted on the tire bead, which progressively overcomes the elastic resistance of the bead, which will bend inwards from the rim, i.e. towards the coupling channel, and open a passage for the work tool end which, after overcoming the inner edge of the bead, rotates about an axis of articulation to the shank and hooks it when the tire repairer reverses the pole displacement direction, i.e. pulls the pole out upwards to overcome the rim edge.

When the hook-shaped tools are forced against a tire bead to bend it and open the passage between the bead and the rim edge, the latter receive a back thrust from the sidewall of the tire which opposes bending.

This back thrust has a generally oblique direction, which extends radial to the tire and is transmitted from the hook to the pole and then from the latter to the operating arm.

One drawback of the prior art is that a radial component of this thrust, i.e. parallel to the plane of the self-centering plane will act upon the pole and hence upon the operating arm which, as a result, will be pushed back and tend to rotate away from the self-centering unit.

Although this rotation is of small amplitude, it is undesired because, if the operating arm, the pole and the work tool mounted to the pole are displaced together, before starting the removal steps they will no longer be at the optimal working position that the tire repairer has defined by operating on the stop apparatus and adjusting it to adapt the position at which the arm rotation will be stopped as a function of the wheel diameter and to precisely establish the point at which the work tool shall be introduced to hook the bead edge and to avoid any damages to the rim or the structure of the sidewall of the tire itself during removal.

Therefore, in the prior art, to obviate this drawback, tire repairers only oppose their own physical force to reaction displacements induced by the introduction of work tools between rim edges and tire beads.

Therefore, the amount of the reaction force opposed by beads will make it difficult, or even impossible, to maintain the optimal position preselected by the stop apparatus.

It should be recalled for clarity that, in a simplified and generally preferred embodiment, a stop apparatus comprises a support bracket, which is fixed in a cantilever fashion to the column and extends therefrom.

A threaded hole extends through the bracket and has a matingly threaded pin transversely engaged therewith, in tightening and loosening directions, and having an operating end facing toward the column and an opposite distal end, which is designed to receive a contacting portion of the operating arm, thereby stopping rotation of the operating arm towards the self-centering unit.

The pin tightening or loosening operation will change the desired position for stopping the rotation of the operating arm towards the self-centering unit and hence will define the precise location at which the work tool will be introduced.

OBJECTS OF THE INVENTION

One object of the invention is to improve the state of the art.

Another object of the invention is to provide an apparatus for angular positioning of an operating arm of a tire changer that allows the operating arm to be positioned at a predetermined location, with the position being held even when reactions are transmitted from a work tool to the operating arm during the steps required to remove tires from their rims.

Another object of the invention is to provide an apparatus for angular positioning of an operating arm of a tire changing machine, that simply, unexpensively and effectively fulfills the intended objects.

In one aspect the invention relates to an apparatus for angular positioning of an operating arm of a tire changing machine as defined by the characteristics of claim 1.

BRIEF DESCRIPTION OF THE DRAWINGS

Further characteristics and advantages of the invention will be more apparent upon reading of the description of an embodiment of an apparatus for angular positioning of an operating arm of a tire changing machine, which is illustrated by way of example and without limitation in the annexed drawings, in which.

DETAILED DESCRIPTION OF A PREFERRED EMBODIMENT

Figure 1:
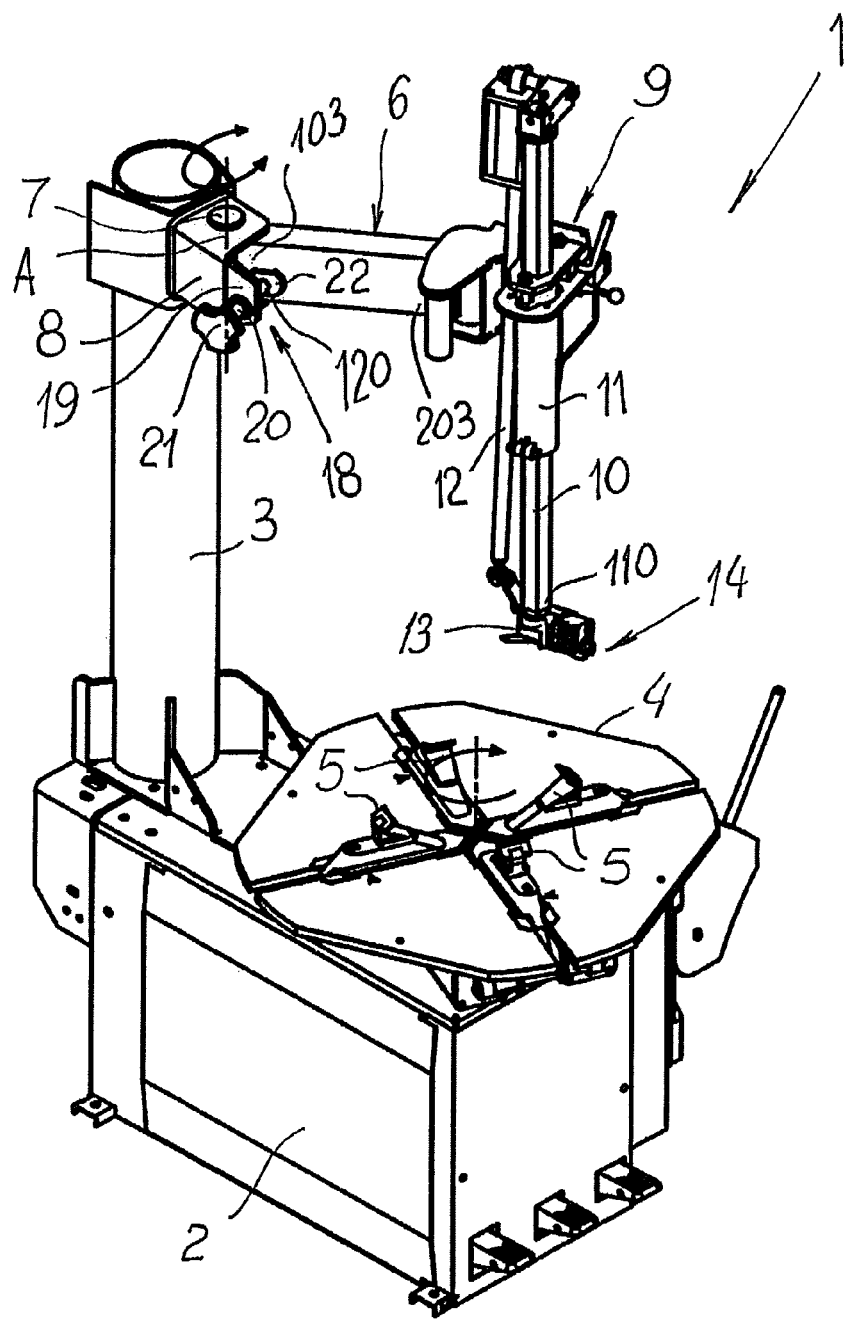
FIG. 1 is a perspective view of a tire changing machine having first lock means for locking the rotation of an operating arm.

Referring to FIG. 1, the tire changing machine 1 is shown to comprise a base 2, a vertical column 3 raising upwards from the base 2 and a platform 4 rotatably mounted to the base 2, which is designed to receive and lock by locking means 5 the wheels "R", from and to which the tires "P" have to be removed or mounted.

A substantially horizontal operating arm, referenced 6 and shortly referred to hereinafter as arm 6, is supported at the upper end of the column 3 as described below, is adapted to swing, and has an end 103 proximal to the column 3 and an opposite distal end 203.

The proximal end 103 is hinged to the column 3 by a hinge 7, which is housed in a support bracket 8 and has a hinge axis "A" substantially parallel to the column 3, i.e. a substantially vertical axis.

The opposite end 203 has connector members 9 designed to support a rod 10, also known as pole and referred to as such hereinafter, which can slide up and down in a guide sleeve 11 that is part of the connector members 9, and is manually operated to move towards or away from the platform 4.

The lower end 110 of the pole 10 has a connector 13, for mounting and removal of work tools 14 designed for use by operators to remove or mount the tires "P" on respective rims "C" of the wheel "R".

Figure 2:
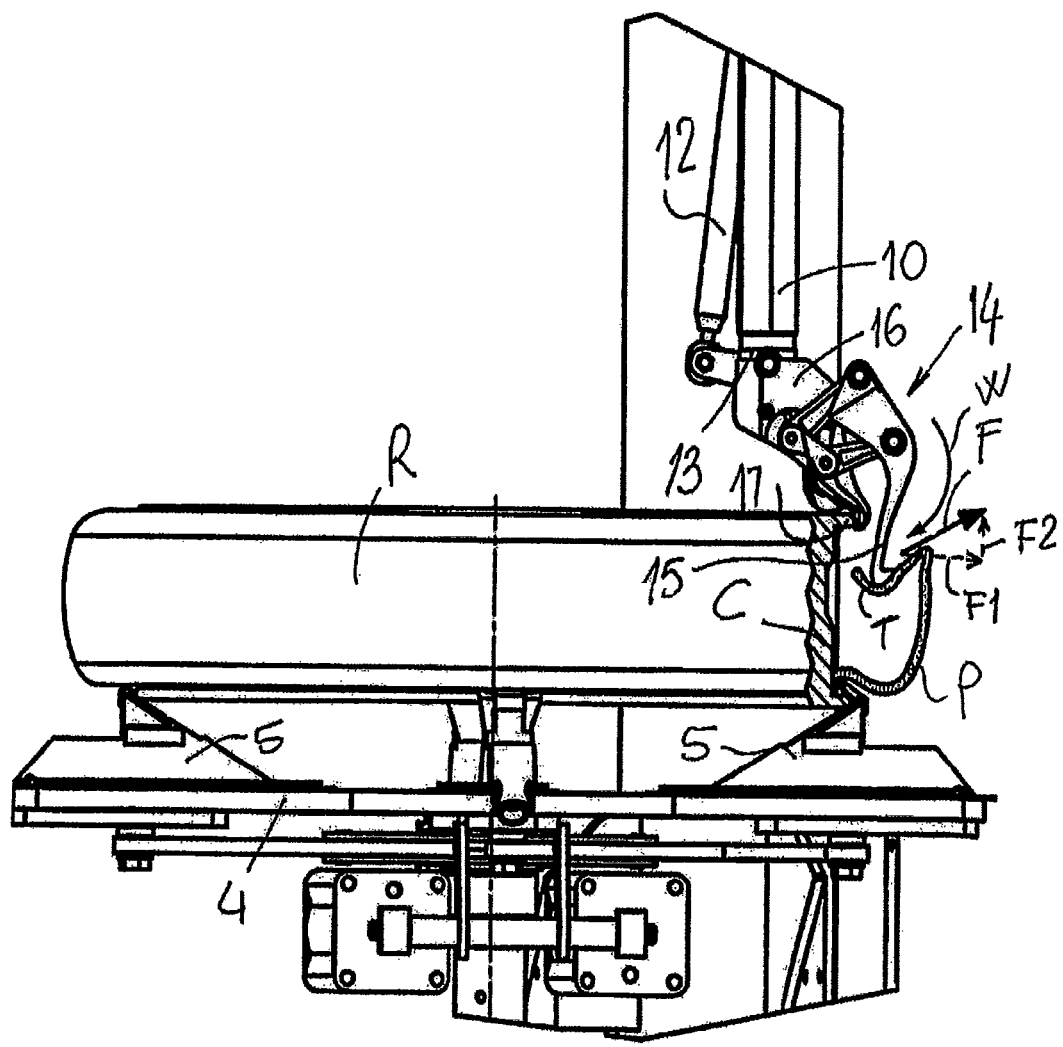
FIG. 2 is a schematic, broken-away view of a step of introducing a work tool between the outer edge of a rim of a wheel locked on a support and lock device of the tire changing machine of FIG. 1 and the inner edge of a tire bead.

Referring to FIG. 2, a possible work tool 14 is shown in detail, which comprises a hook element 15 mounted to a support 16 that can be attached to the connector 13 and that can be introduced between an edge 17 of the rim "C" and a bead "T" of the tire "P", after bending the bead "T".

In FIG. 2, the work tool is shown to have the hook 15 articulated to the support by a parallelogram linkage.

Here, the articulation between the support 16 and the hook element 14 allows the latter to rotate and automatically adapt to the best introduction position between the edge 17 and the bead "T".

As also shown in FIG. 2, the bent bead "T" generates an elastic reaction force, schematically designated by the arrow "F", which is directed substantially oblique to the platform 4 and can be resolved into its two horizontal "F1" and vertical "F2" components, according to the well-known vector addition rule.

Figure 3:
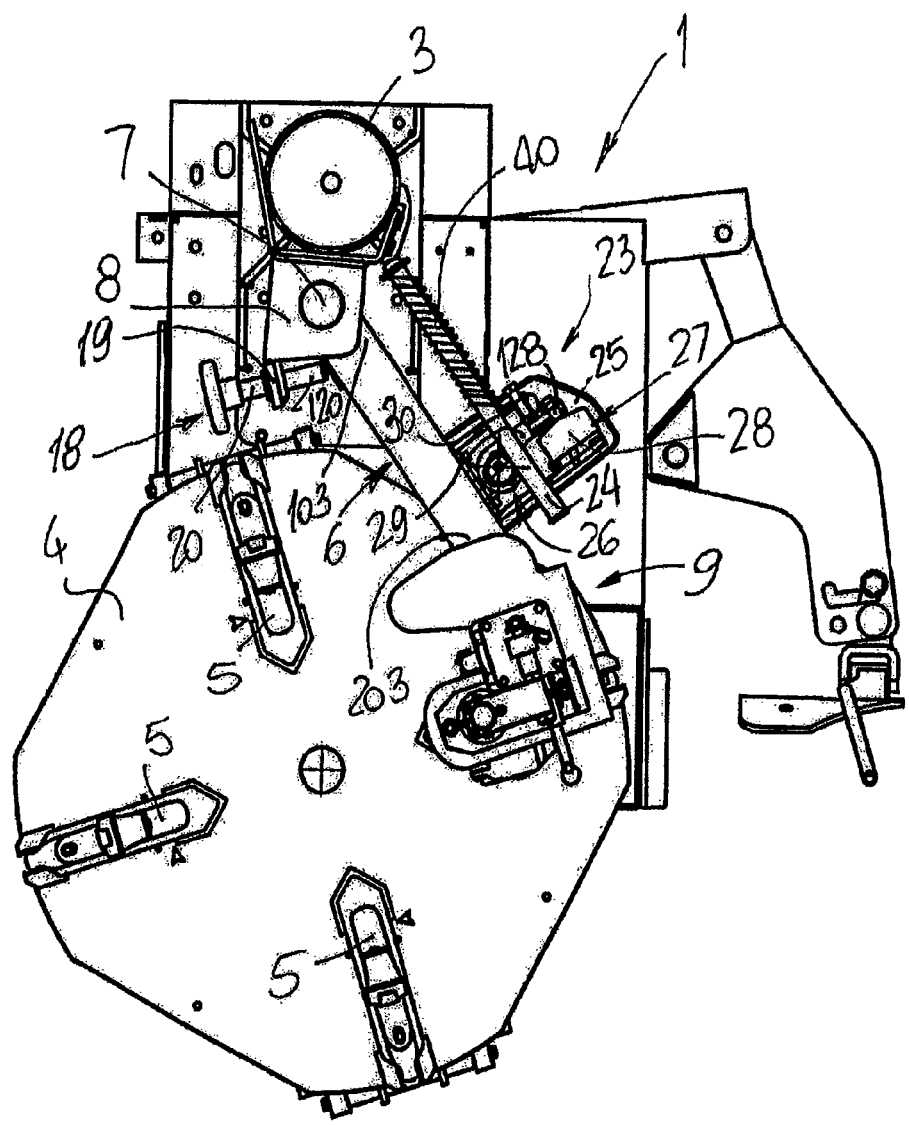
FIG. 3 is a top view of the tire changing machine of FIG. 1, equipped with the apparatus for angular positioning of an operating arm of a tire changing machine of the invention.
Figure 4:
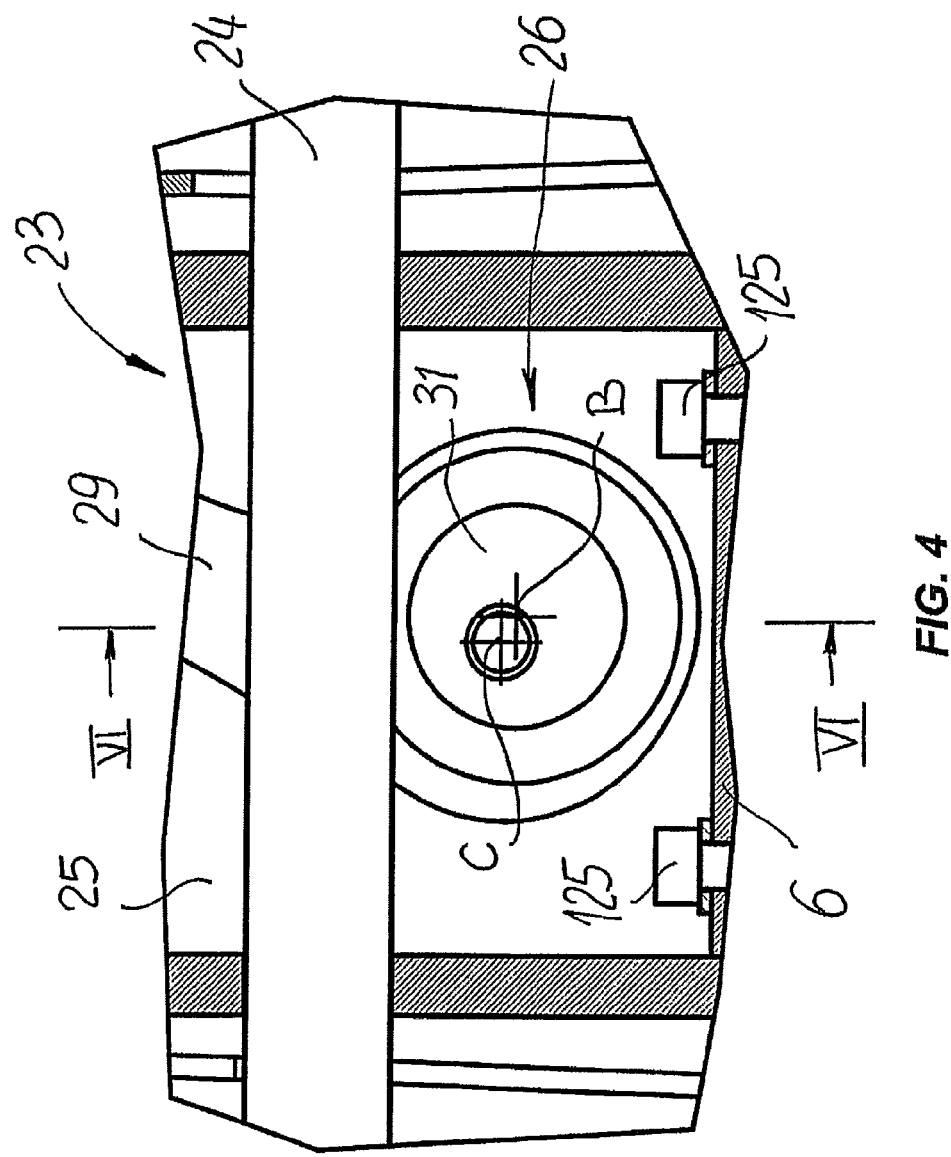
FIG. 4 and FIG. 5 are enlarged and broken away top views of lock means for locking the rotation of the operating arm, in the unlocked and locked states respectively.

Referring to FIGS. 1 and 3, it can be seen that first lock means 18 are arranged between the arm 6 and the column 3, for locking rotation of the arm 6 towards the platform 4.

The first lock means 18 are adjustable and include a plate 19 extending from the support bracket 8, and having a threaded hole therethrough for a threaded pin 20 to be screwed therein, the latter having an operating end with a knob 21, and an opposite free end 120, which is designed to stop by contact the rotation of the arm 4 towards the platform 4.

The free end 120 is received in contact with a pad 22, which is mounted integral with the outer surface of the arm 6, namely integrally mounted to a side thereof, the arm 6 having a prismatic section.

Referring now to FIG. 3, second lock means 23 for locking the swinging motion of the arm 6 away from the platform 4 are arranged on a side of the arm 6 opposite to the first lock means 18.

These second lock means 23 include a rod 24, which is slidably mounted in a support 25 fixedly associated with the arm 6, e.g. by means of bolts 125.

The rod 24 is substantially parallel to the arm 6 and adapted to slide in the support 25.

The lock means 23 also include an eccentric assembly 26 arranged in said support 25 and alternately movable by drive means 27 between a position in which the sliding motion of the rod 23 is locked and a position in which the latter is free to slide.

As shown in FIG. 3, as well as in FIGS. 4 to 7, the drive means 27 also include at least one second linear fluid dynamic actuator 28, whose shaft 128 has one end restrained by a small arm 29 which is adapted to rotate in the support 25, by the thrust action of the shaft 128, against a pressure-loaded spring 30, and about an axis of rotation "B".

A prismatic body 31 is mounted to the small arm 29 at an end opposite to the restraint of the shaft 128, which body has a longitudinal axis "C" parallel to the axis of rotation "B", and eccentric thereto.

As the small arm 29 rotates, it alternately moves the prismatic body 31 between a position in contact with the outer surface of the rod 24 and another position away from it, or vice versa.

In the former case, the sliding motion of the rod 24 is locked, in the latter it is free.

Figure 6:
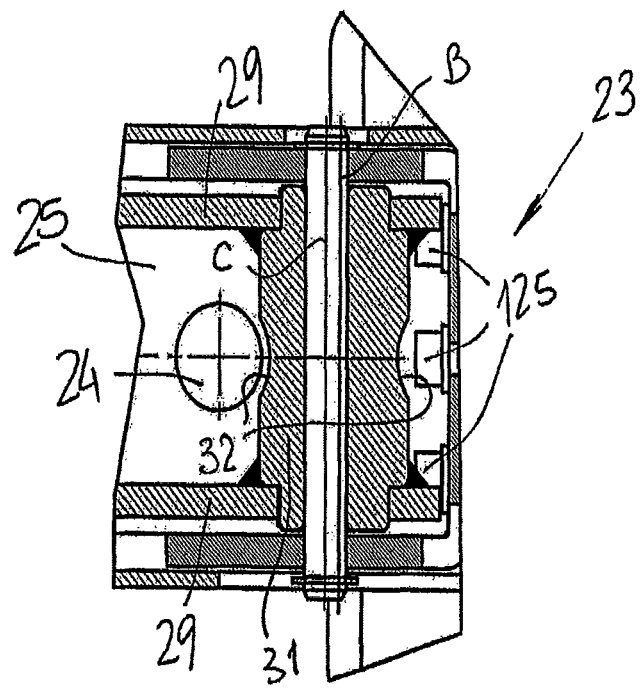
FIG. 6 and FIG. 7 are cross sectional broken-away views of the corresponding FIGS. 4 and 5.
Figure 7:
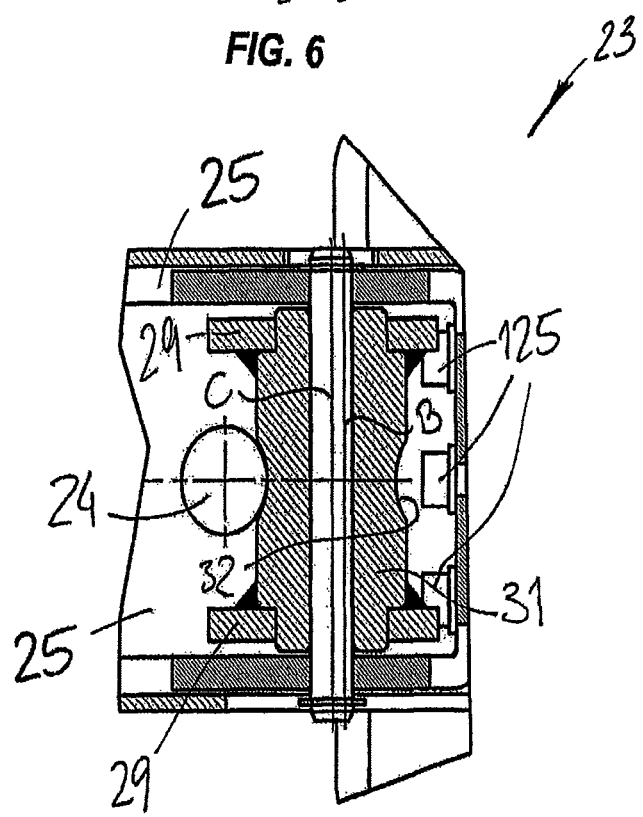

More in detail, as shown in FIGS. 6 and 7, the prismatic body 31 has a substantially cylindrical shape, with its ends fitted in special seats formed in the small arm 29, and a peripheral groove 11 in a substantially middle area, whose profile matches the outer profile of the rod 24.

Figure 8:
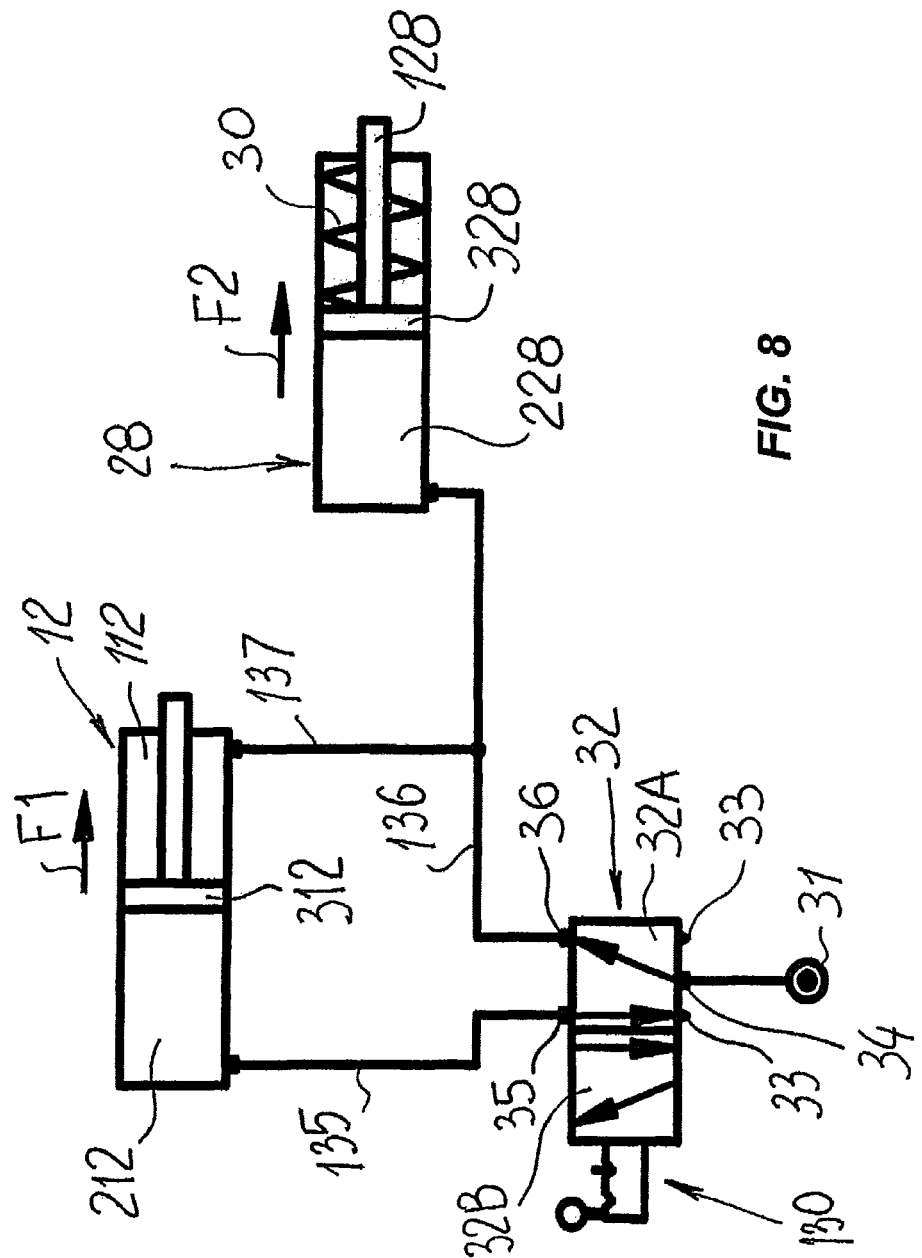
FIG. 8 and FIG. 9 show two diagrams of the fluid-dynamic circuits for actuating the apparatus for angular positioning of an operating arm of a tire changing machine of the invention, with the positioning apparatus being enabled and disabled respectively.
Figure 9:
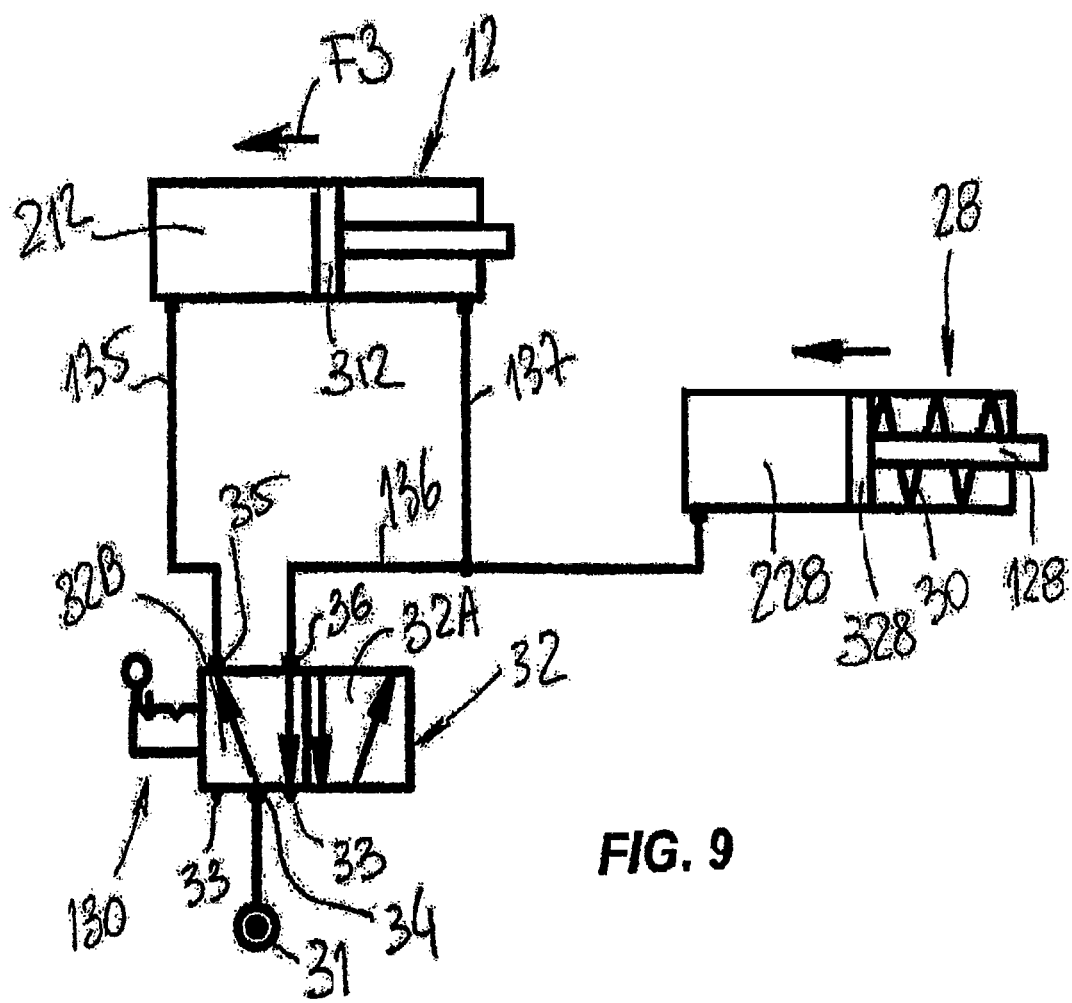

Referring to FIGS. 8 and 9, there are shown two operating steps of a fluid dynamic, namely pneumatic, circuit, which actuates both the rotation of the hook element 15 for introduction or removal, and the second lock means 23 in a coordinated fashion, i.e. such that, once the arm 6 is rotated to the selected position, when the operator activates an actuating control 130 of the actuator 12 which moves the hook element 15 between the bead "T" and the edge 17 of the rim "C", the second lock means 24 are in an operating state whereas, when the operator activates the control 130 in reverse mode, i.e. pulls the hook element 15 upwards, the second lock means 23 will switch their state from operating to idle.

More in detail, a compressed air source 31 is shown, which is connected via a feeding port 34, to a distribution valve 32 having two operating positions, i.e. a position 32A and a position 32B, two discharge ports 33 and two supply ports 35 and 36.

The latter are connected to the first fluid dynamic actuator 12 and the second fluid dynamic actuator 28 respectively, with respective connecting lines 135 and 136.

Furthermore, the first fluid dynamic actuator 12 is a double-acting actuator and has an additional line 137 connected with the line 136.

As shown in FIG. 8, when the distributing valve 32 is driven into the work position 32A as shown, the compressed air simultaneously reaches a thrust chamber 228 of the second linear fluid dynamic actuator 28 and a return chamber 112 of the first linear actuator 12.

In this configuration, the respective pistons 328 and 312 move in the directions of arrows F1 and F2.

As shown in FIG. 8, a thrust chamber 212 of the first fluid dynamic actuator 12 is put in a discharge state through the line 135 and the corresponding discharge port 33.

In short, the pneumatic configuration of FIG. 8 shows the state in which the sliding motion of the rod 24 is locked, whereas the reversed configuration of FIG. 9 shows the state in which the rod 24 is free to slide.

Thus, referring to FIG. 9, the work position 32B is shown to connect the compressed-air source with the thrust chamber 212 of the first fluid dynamic actuator 12, thereby causing the piston 312 to move in the direction of arrow F3, whereas the return chamber 112 and the thrust chamber 228 of the second fluid dynamic actuator 29 are connected to the discharge port 33.

Therefore, the piston 328 moves in the direction of arrow F4.

In order that the rod 24 can be always held in contact with the column 3, a spring 40 is mounted coaxial to the latter, whose ends are respectively contained between the support 25 and an abutment washer 41, which is transversely mounted in the proximity of the end of the rod 24 proximal to the column 3.

The operation of the invention is as follows: an operator lays a wheel "R" on the platform 4 and locks it by the locking members 5.

In this step, the arm 6 is held in a position away from the platform 4, for easy, interference-free handling of the wheel "R" by the operator.

Once the wheel "R" has been locked on the platform 4, the operator holds the arm 6 and rotates it toward the platform, thereby bringing the work tool 14, namely the hook element 15, to the vertical line of the point in which it has to penetrate between the bead "T" of the tire "P" and the edge 17 of the rim "C".

Then the operator adjusts the first lock means 18 for the free end of the threaded pin 20 to contact the lateral surface of the arm 6, thereby preventing any further rotation thereof toward the platform 4.

As the operator operates the control 130 (FIG. 8), the distributing valve 32 will move into the work position 32A and drive simultaneously the first actuator 12 and the second actuator 28.

Figure 5:
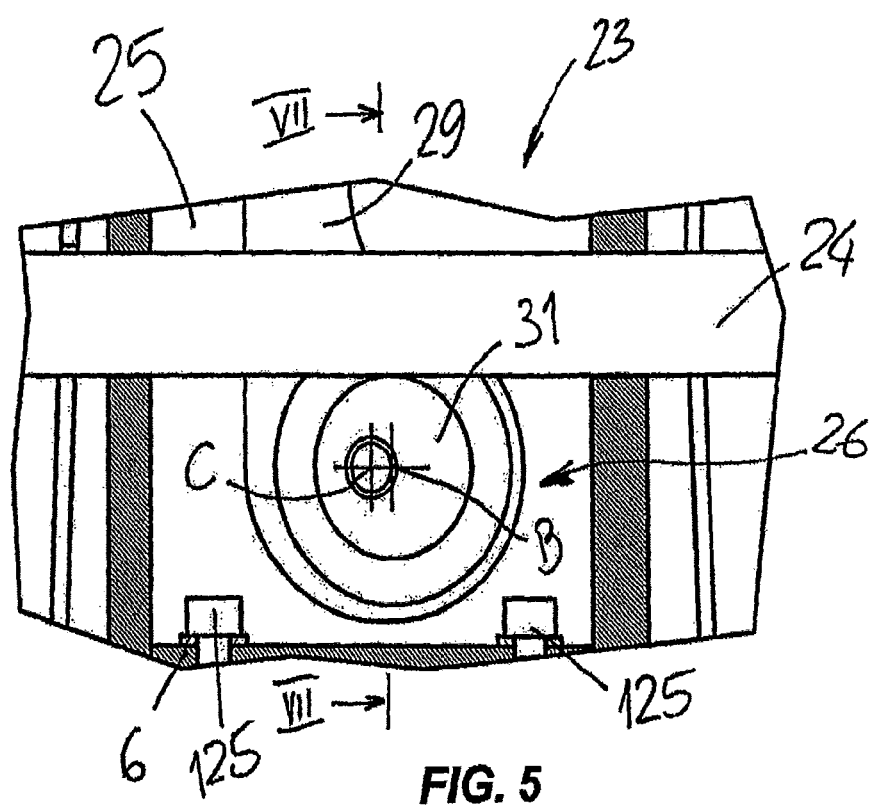

The first actuator 12 will rotate the hook element 15 toward the wheel "R" and push it between the bead "T" and the edge 17 of the rim "C", whereas the second actuator 28 will overcome the opposing force of the spring 30, that will be thus compressed and loaded, and rotate the small arm 29, thereby moving the prismatic body 31 to contact with the outer surface of the rod 24, thereby locking its sliding motion relative to the support 25 (FIG. 5).

Thus, the rotation of the arm 6 will be prevented in both directions and the operator-defined position of the arm 6 will be maintained throughout the step of introducing the hook element 15 between the bead "T" and the edge 17 of the rim "C".

Once the hook element 15 has been introduced and the bead "T" has been automatically hooked thereby, the operator will operate the control 130 (FIG. 9) to move the distributing valve 32 to the work position 32B and will simultaneously pull back the hook element 15 upwards, thereby removing the bead "T" from the edge 17 of the rim "C".

In this configuration, the thrust chamber 228 of the second actuator 28 is connected to the discharge, and the spring pushes the piston 328 in a direction opposite to the previous one.

The shaft 128 will rotate the small arm 29 in such opposite direction (FIG. 4), and the prismatic body 31 will move away from the rod 24, thereby releasing its sliding motion and allowing the arm 6 to rotate again away from the platform 4.

It shall be noted that, as the hook element 15 is so lifted, the thrust chamber 228 of the second actuator 28 will be emptied more slowly than the thrust chamber of the first actuator 12, whereby the sliding motion of the rod 24 will be unlocked with a given delay with respect to the removal of the bead "T" from the edge 17.

The above disclosed invention was found to fulfill the intended objects.

The invention is susceptible to a number of changes and variants within the inventive concept.

Furthermore, all the details may be replaced by other technically equivalent parts.

In practice, any materials, shapes and sizes may be used as needed, without departure from the scope of the following claims.

The invention claimed is:

1. An apparatus for angular positioning of an operating arm of a tire changing machine, said arm comprising:
   a proximal end hinged to a column extending vertically from a base of the tire changing machine, so as to swing in a horizontal swinging plane in a first rotation direction toward a work position and alternately in a second rotation direction opposite said first rotation direction and toward a rest position;
   a distal end to which a support element of work tools is associated, said distal end being opposite said proximal end; and
   a first mechanical lock or stop preventing rotation of said operating arm in said first rotation direction,
   wherein said apparatus comprises (i) a second mechanical lock or stop preventing rotation of said operating arm in said second rotation direction opposed to said first rotation direction, (ii) an actuator operatively connected to said second mechanical lock for setting or activating said second mechanical lock, and (iii) a circuit operatively connected to said actuator for triggering controlling operation thereof.

2. An apparatus according to claim 1, wherein said second mechanical lock or stop is automatically engaged or operated by said actuator under control of said circuit when a work tool mounted to said distal end via said support element reaches said work position.

3. An apparatus according to claim 1, wherein said second mechanical lock or stop comprises:
   at least a stem mounted in a support fixed to said operating arm and slidable in parallel to said operating arm in said support;

an eccentric arrangement fitted inside said support and alternatively movable between a sliding locking position in contact with said stem and freely sliding position away from said stem.

4. An apparatus according to claim 3, wherein an elastic element opposing a sliding of said stem is interposed between said stem and said support.

5. An apparatus according to claim 3, wherein said stem comprises a first constant contact end with a corresponding contact point defined on said column, and a second opposing end.

6. A tire changing machine comprising an angular positioning apparatus of an operating arm of a tire changing machine according to claim 1.

7. An apparatus for angular positioning of an operating arm of a tire changing machine, said arm comprising:
- a proximal end hinged to a column extending vertically from a base of the tire changing machine, so as to swing in a horizontal swinging plane in a first rotation direction toward a work position and alternately in a second rotation direction opposite said first rotation direction and toward a rest position;
- a distal end to which a support element of work tools is associated, said distal end being opposite said proximal end; and
- a first mechanical lock or stop preventing rotation of said operating arm in said first rotation direction,
- wherein said apparatus comprises a second mechanical lock or stop preventing rotation of said operating arm in said second rotation direction opposed to said first rotation direction,
- wherein said second mechanical lock or stop comprises:
- at least a stem mounted in a support fixed to said operating arm and slidable in parallel to said operating arm in said support;
- an eccentric arrangement fitted inside said support and alternatively movable between a sliding locking position in contact with said stem and freely sliding position away from said stem, and
- wherein said eccentric arrangement comprises:
- a substantially cylindrical element having a prismatic body having an outer contact surface and a longitudinal axis;
- a rotating bracket on which said cylindrical element is mounted and having a rotation axis parallel to, and eccentric with respect to said longitudinal axis;
- an extension of said rotating bracket designed to be alternatively rotationally handled by an actuating arrangement according to selected angles; and
- an elastic element arranged to oppose rotations of said rotating bracket.

8. A tire changing machine comprising an angular positioning apparatus of an operating arm of a tire changing machine according to claim 7.

9. An apparatus for angular positioning of an operating arm of a tire changing machine, said arm comprising:
- a proximal end hinged to a column extending vertically from a base of the tire changing machine, so as to swing in a horizontal swinging plane in a first rotation direction toward a work position and alternately in a second rotation direction opposite said first rotation direction and toward a rest position;
- a distal end to which a support element of work tools is associated, said distal end being opposite said proximal end; and
- a first mechanical lock or stop preventing rotation of said operating arm in said first rotation direction,
- wherein said apparatus comprises a second mechanical lock or stop preventing rotation of said operating arm in said second rotation direction opposed to said first rotation direction, said second mechanical lock or stop including an eccentric locking mechanism being mounted to said operating arm at a location between said proximal end and said column on one side and said distal end and said support element on an opposite side.

10. An apparatus according to claim 9, wherein said second mechanical lock or stop comprises:
- at least a stem mounted in a support fixed to said operating arm and slidable in parallel to said operating arm in said support;
- an eccentric arrangement fitted inside said support and alternatively movable between a sliding locking position in contact with said stem and freely sliding position away from said stem.

11. An apparatus according to claim 10, wherein an elastic element opposing a sliding of said stem is interposed between said stem and said support.

12. An apparatus according to claim 10, wherein said stem comprises a first constant contact end with a corresponding contact point defined on said column, and a second opposing end.

13. An apparatus according to claim 9, wherein said second mechanical lock or stop is automatically actuated when a work tool mounted to said distal end via said support element reaches said work position.

14. A tire changing machine comprising an angular positioning apparatus of an operating arm of a tire changing machine according to claim 9.

* * * * *